July 24, 1962 W. D. BROWN, JR 3,045,609
TROLLEY TRANSFER MEANS
Filed March 31, 1961 4 Sheets-Sheet 1
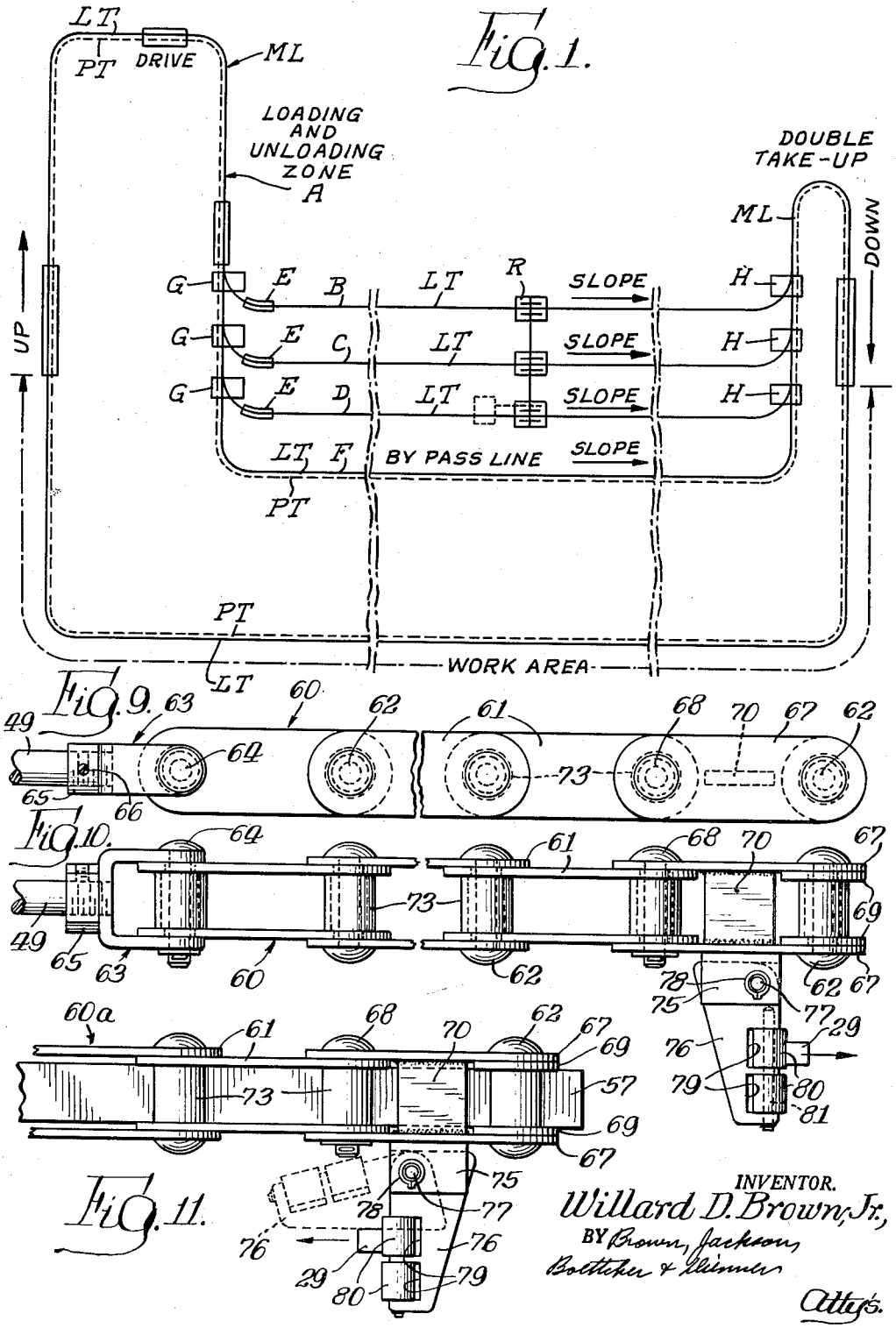
INVENTOR.
Willard D. Brown, Jr.,

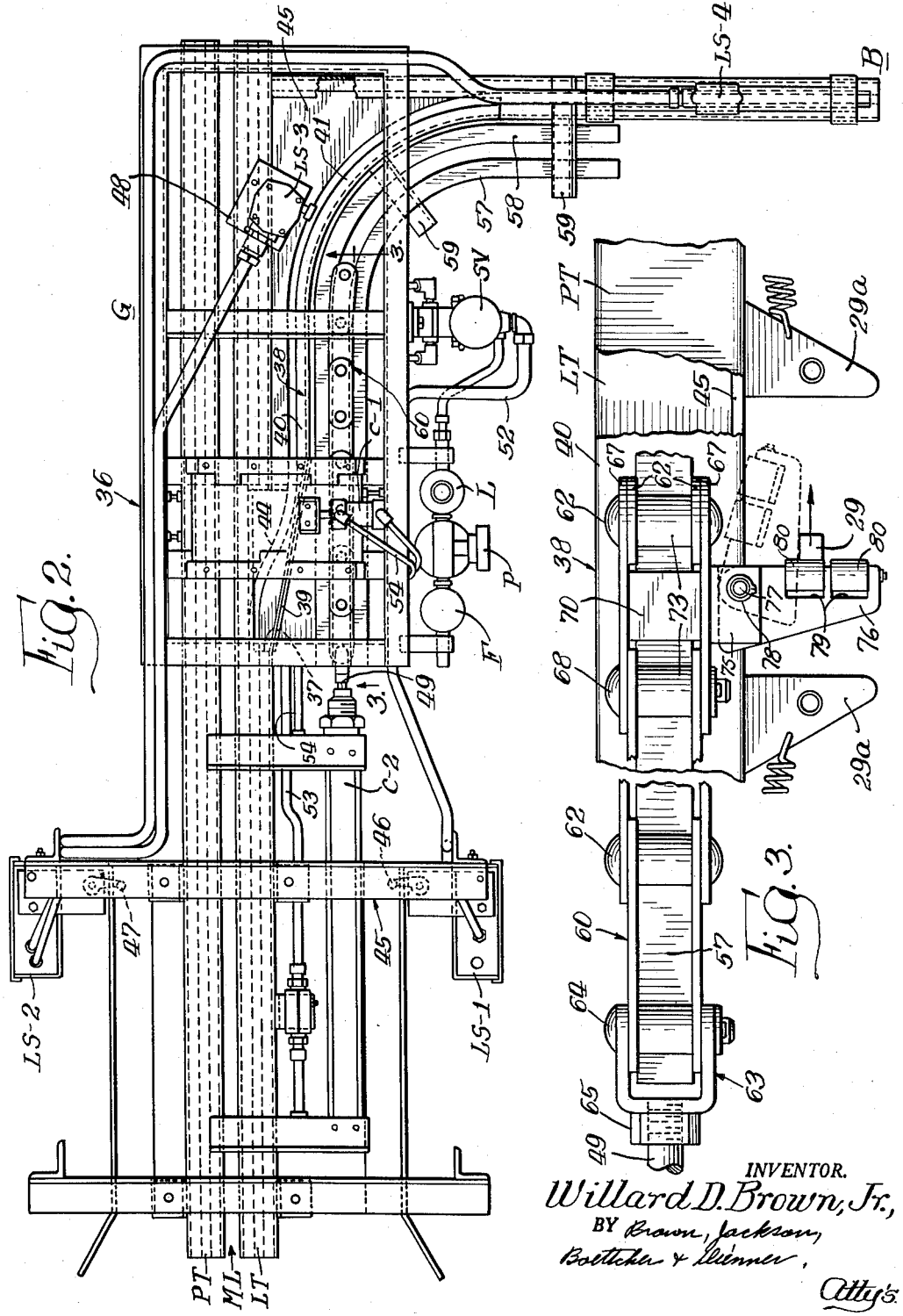

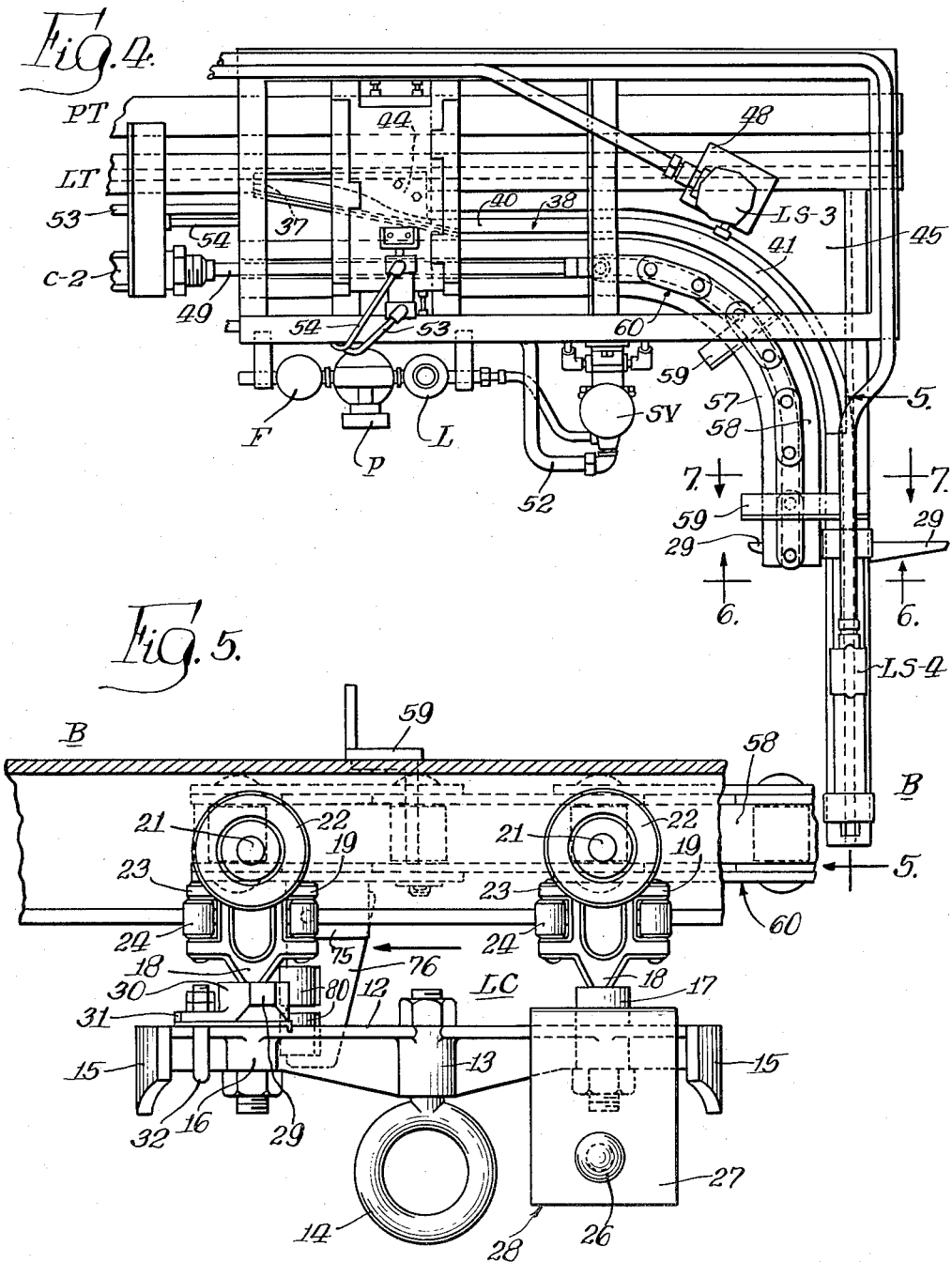

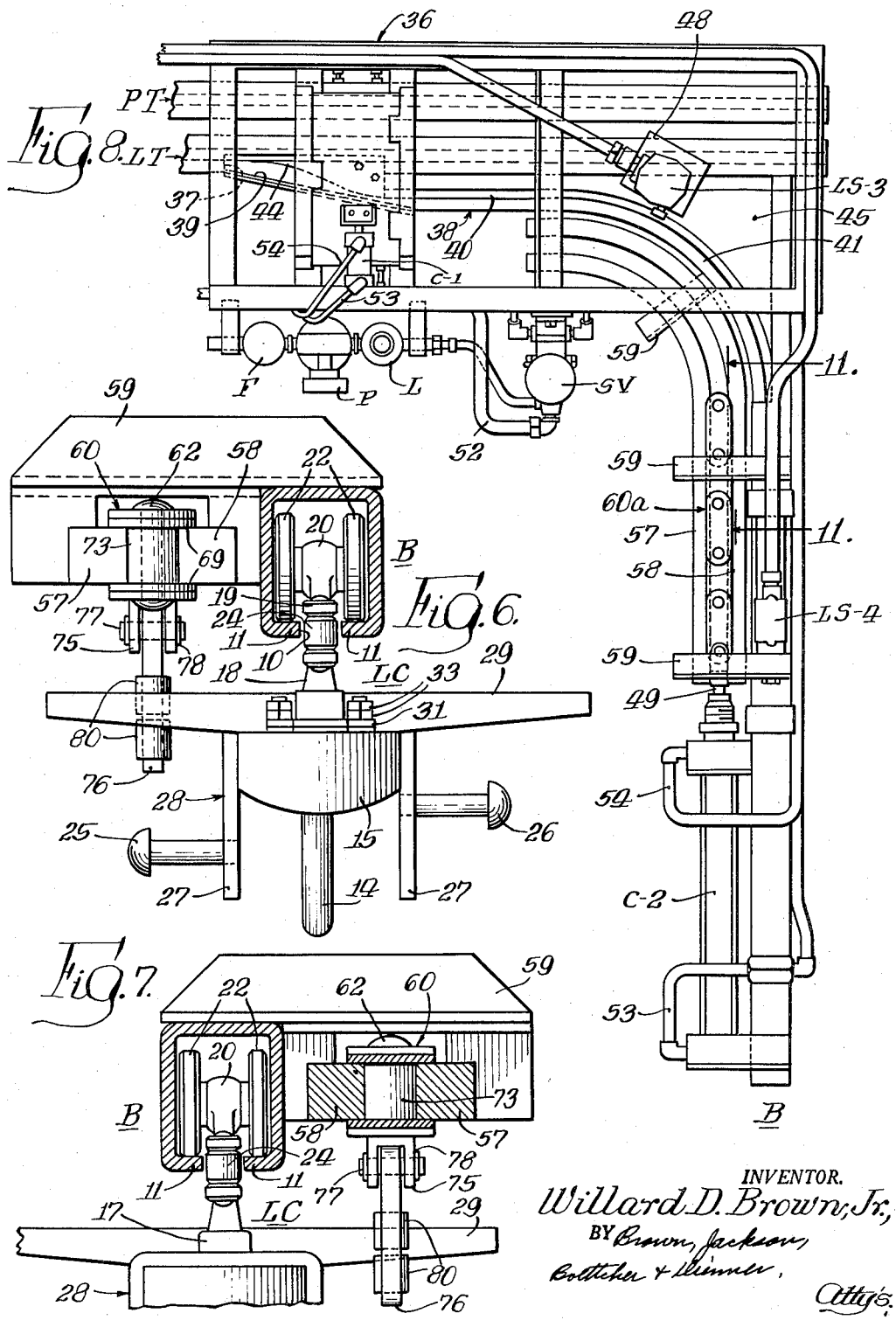

3,045,609
TROLLEY TRANSFER MEANS
Willard D. Brown, Jr., Aurora, Ill., assignor to Richards-Wilcox Manufacturing Company, Aurora, Ill., a corporation of Illinois
Filed Mar. 31, 1961, Ser. No. 99,829
12 Claims. (Cl. 104—88)

This invention relates to trolley transfer means for transferring load supporting carriages or trolleys to and from storage tracks of overhead automatic dispatch conveyor systems. Such systems are used in factories or shops to convey articles in process of manufacture from one area to another such, for example, as from a painting area to a storage track, on which the articles are stored until the paint has dried and from which they are delivered to a load track along which they are moved by a pusher chain to another area for further processing or such other operation, such as packing and shipping, as may be appropriate.

Conveyor systems of the type above mentioned comprise a load track along which the load carrying trolleys are moved by a pusher chain of a power track, storage tracks and feed-in and escapement track switches for diverting the trolleys from the load track to the storage tracks and delivering the trolleys from the storage tracks to the load track. The track switches are controlled by electric switches actuated by the trolleys, and the travel of the trolleys through the track switches, to and from the storage tracks, is effected by trolley transfer means also controlled by trolley actuated electric switches. The load sizes and the trolleys of a given system may vary substantially from those of another system. It is necessary that, in effecting transfer of a trolley, the latter be properly positioned for engagement by the transfer means preliminary to moving the trolley from the load track onto the storage track. It also is necessary that the trolley be properly positioned relative to the load track to be picked up by the pusher or power chain, in effecting transfer of a trolley from a storage track to the load track. Accordingly, it is the usual practice to make the transfer means initially of a definite length tailored to the particular system in which it is to be used. That often is expensive and may incur undesirable delay in installing the system and effecting accurate adjustment of the transfer means.

My invention is directed to transfer means adapted for use with either a feed-in switch or an escapement switch, in a conveyor system of the character above mentioned, and which may be adjusted with expedition and facility to suit the requirements of the particular system in which it is to be used. To that end I provide transfer means comprising a trolley moving or propelling member the length of which may be quickly and easily adjusted to assure accuracy of operation of the transfer means. The transfer member may be initially of a standard length and can be readily adjusted in length to meet requirements, thereby avoiding the expense and delay of constructing individual track switch transfer means for each conveyor system. Further objects and advantages of my invention will appear from the detail description.

In the drawings:

FIGURE 1 is a diagrammatic plan view of the track layout of an automatic conveyor system in which the trolley transfer means of my invention may be used;

FIGURE 2 is a top plan view of a feed-in switch portion or unit of the system of FIGURE 1 comprising trolley transfer means embodying my invention with the transfer member disposed for effecting the transfer operation;

FIGURE 3 is a sectional view, on an enlarged scale, taken substantially on line 3—3 of FIGURE 2, the arm only of the trolley being shown;

FIGURE 4 is a top plan view of the trolley transfer means of my invention and associated elements, the parts being shown in the positions which they occupy upon completion of a transfer operation, with certain parts broken away;

FIGURE 5 is a sectional view, on an enlarged scale, taken substantially on line 5—5 of FIGURE 4;

FIGURE 6 is a sectional view, on an enlarged scale, taken substantially on line 6—6 of FIGURE 4;

FIGURE 7 is a sectional view, on an enlarged scale, taken substantially on line 7—7 of FIGURE 4, the upper portion only of the trolley being shown;

FIGURE 8 is a fragmentary view similar to FIGURE 2 of a modified form of my invention in which the transfer means power cylinder is mounted adjacent the storage track;

FIGURE 9 is a top plan view, on an enlarged scale of the transfer means pusher chain broken away for the major portion of its length, showing also the adjacent end portion of the piston rod of the power cylinder;

FIGURE 10 is a side view of the pusher chain of FIGURE 9; and

FIGURE 11 is a side view, on an enlarged scale, of the trolley arm engaging end portion of the transfer means chain of FIGURE 8, taken substantially on line 11—11 of that figure.

I have shown the trolley transfer means of my invention as used, by way of example, in a conveyor system such as that disclosed in the copending application of Albert J. Burmeister and Willard D. Brown, Jr., for Conveyor System and Control, Serial No. 834,101, filed August 17, 1959, though it may be used in any suitable or analogous system, within the broader aspects of my invention, as will be understood.

Referring first to FIGURE 1, this illustrates diagrammatically in plan a very basic layout of an automatic dispatch conveyor system. Those portions of this track layout which are shown in full lines represent load tracks LT along which the load supporting carriers travel. The closed loop portion of the layout shown in dotted lines represents the power track PT in which travels a power driven pusher chain for propelling the load supporting carriers along the load track LT lying in horizontally spaced side-by-side relation to the power track PT. In this basic layout, a loading and unloading zone is indicated at A, where the manufactured articles or other goods are loaded upon and unloaded from the wheeled load carriers. Branching from the main line just beyond this loading and unloading zone A are three storage lines B, C, and D, each consisting solely of a load track LT without any juxtaposed power track PT. At the entrance end of each of these storage lines B–D is a full line sensing device E, which assumes a certain control position when its particular storage line becomes filled up with load carriers. For example, when non-selective load carriers are used, the first storage line B will fill up with load carriers until its full sensing device E renders the feed-in switch inactive. Thereupon, storage line C will load up until its full line sensing device E renders its feed-in switch inactive. Thereupon, storage line D will fill up until its full line sensing device E responds by rendering its feed-in switch inactive. Following this, subsequent load carriers will continue on around through by-pass line F and back to the starting point, from whence they will repeat the cycle of trying to get into one of the storage lines B, C or D.

The automatic feed-in switch units which feed in or divert the load carriers from the main line ML to the branch storage lines, B, C and D, are diagrammatically illustrated in FIGURE 1 at G. The automatic escapement switch units which return the load carriers from the branch storage lines B, C and D back onto the main line ML are diagrammatically illustrated at H. If desired, each of the branch storage lines B, C and D may have a retarder device interposed therein. The desirability or necessity of such retarder device R depends upon the length of each storage line, the slope of the line, the weight of the load carried by each load carrier, and the susceptibility of the load to damage resulting from the possible end dumping of the load carriers on the storage lines.

It will be understood that the movement of the load carriers along the branch storage tracks B, C and D occurs solely under the action of gravity by reasons of the downhill slope of these tracks, there being no power track or pusher chain associated with any of these storage lines. The different uphill and downhill slopes in the system are denoted in FIGURE 1.

Referring to FIGURE 6, it will be seen that the storage track B is of rectangular box-like section having a longitudinally extending central slot 10 in its bottom wall. The flange lips 11 lying on both sides of the slot 10 constitute the supporting rails along which the vertical wheels or rollers of the load carriers travel. The load track LT and the power track PT are likewise of box-like construction with a longitudinally extending central slot and need not be further described here.

The load carriers or trolleys LC may be of any suitable type but preferably are similar to those disclosed in the above identified copending application. Referring to FIGURES 5 and 6, each load carrier LC comprises a main horizontal load bar 12, which may be of different lengths for different load carrying capacities, ranging from approximately 10 inches to 16 inches in length. Formed centrally in this load bar 12 is a vertical boss 13 in which is mounted a depending eye bolt 14, or other suitable load suspension device. The ends of the load bar 12 are formed with curved bumpers 15 for bumping engagement with adjacent load carriers. Formed adjacent the front and rear ends of the load bar 12 are front and rear vertical bosses 16 and 17 respectively, in both of which bosses the shanks 18 of wheeled suspension hangers or wheel trucks 19 have swiveled mounting for rotation about vertical axes. At the upper end of each wheel truck is a horizontal boss 20 (FIGURES 5 and 6) from the opposite sides of which project a pivot pin or pins 21. Rotatably mounted on anti-friction ball bearings carried on such horizontal pivot pin or pins 21 are vertical load supporting wheels or rollers 22 which roll along the supporting flanges 11 at opposite sides of the central slot 10 in the storage track B.

Formed to extend from the front and rear sides of each wheel truck 19 in the fore-and-aft plane of the track slot 10 are upper and lower fork arms 23 carrying vertical pivot pins on which are pivoted vertical guide rollers 24. These guide rollers have a loose rolling clearance in the track slot 10, and function to carry the side load incident to following the track slot 10, particularly in rounding curves.

In FIGURES 5 and 6 I have shown the load carrier or trolley LC as provided with a very simple arrangement of station selecting pins. These comprise left hand selector pin 25 and right hand selector pin 26, which project horizontally outwardly to the left and to the right from the side flanges 27 of an inverted U-shaped stirrup 28. This stirrup has a central aperture in the cross bar portion thereof that fits down over the rear vertical boss 17 of the load bar, the depending side flanges 27 having a snug fit against the side edges of the load bar 12. These selector pins 25, 26 are mounted at coded heights in the side flanges 27 so as to actuate appropriate selector switches in the travel of the trolley, whereby to actuate certain feed-in switches, etc, as will appear later.

The propelling power of the pusher or power chain (not shown) traveling in the power track PT is transmitted to the trolley LC through a transversely extending pusher bar 29 having arms extending outwardly from the opposite sides of the load bar 12, adjacent the front end thereof. This pusher bar has a central boss 30 which fits down over the front vertical boss 16 of the load bar. An apertured flange 31 projects forwardly from the central portion of the pusher bar, and passing upwardly through the apertures in said flange 31 are the threaded side arms of a U-shaped clevis 32 which embraces the underside of the load bar 12. These side arms of the clevis receive nuts 33 which rigidly clamp the clevis 32 and pusher bar 29 to the load bar 12. That portion of the pusher bar that projects toward the power track PT lies directly below the central slot in the power track PT in position to be engaged by propelling dogs 29a mounted on the pusher chain travelling in the power track. The pusher chain may be of any suitable type. Preferably, it is constructed the same as the pusher chain of the above identified copending application and is similar to that disclosed in the Hassler Patent No. 2,372,199 issued March 27, 1945. The pusher chain need not be described in detail, it sufficing to state that it is of known type and is provided with pairs of dogs appropriately disposed to engage the pusher bars or arms of the trolleys for propelling the latter along the load track.

The construction and operation of one of the feed-in switch units G are shown in FIGURE 2. It will be seen that the power track PT extends continuously and without interruption through the unit G from the entering section of the main line ML to the exit section of the main line. A suitably mounted rectangular frame 36 of angle iron construction in part overlies the entrance end portion of one of the storage tracks, the track B, for example, and in part overlies the main line ML. The load track LT is cut away from its inner side to the bottom slot thereof, for a short distance lengthwise, providing a rectangular notch or opening 37 therein. An entrance guide member 38, secured to frame 36, seats at its outer end in the outer end of notch 37, adjacent the end of the portion of frame 36 overlying the main line ML. The guide member 38 comprises an outer straight portion 39 inclined away from load track LT and merging into a second straight portion 40, the latter portion merging into a curved portion 41 of circular curvature and extending through an arc of approximately ninety degrees. The other or inner end of guide member 38 seats in a notch cut in storage track B, at the inner side thereof, in the same manner as its outer end seats in notch 37 of load track LT. The portions 40 and 41 of guide member 38 are of channel cross section corresponding to one half of the width of the storage track B and the load track LT, respectively. The inner end of portion 41 seats against the contiguous end of the inner side of storage track B, in accurate alignment therewith, and the outer end of portion 39 is provided at its inner side with an upwardly extending flange which seats against the adjacent end of the inner side wall of load track LT in approximate alignment therewith. The bottom flange of portions 40 and 41 of guide member 39 is of the same width as the inner bottom flange 11 of storage track B and is in accurate register therewith. The outer end portion 39 of guide member 38 is of approximately the same length as the notch 37 in the load track LT and has its inner edge curved inwardly and then outwardly to the inner flange of track LT, the outer end of portion 39 being of the same width as, and in accurate register with, the contigous end of the inner flange of track LT.

A switch point 44 is mounted in the gap or notch 37 of the load track LT and is moved to its feed-in position shown and to a straight-through position, by means of an air cylinder or pneumatic motor C–1. When in its feed-in position the switch point 44 is disposed to divert a trolley from the load track LT into the entrance slot then defined by its curved inner edge and portion 39 of guide member 38 and by portions 40 and 41 of guide member 38 in cooperation with a guide plate 45 mounted on frame 36. The diverted trolley is moved by dog 29a along guide member 38 and plate 45 to a position to be picked up by the transfer means. In that connection, pusher bar 29 of the trolley LC is of proper length to be contacted by dog 29a for moving the trolley into the entrance slot and along the guide means to pick-up position, at which time dog 29a clears bar 29 and continues its travel along the power track PT, as will be understood. When the switch point 44 is in its straight-through position the trolleys may continue their travel along the load track LT, being propelled therealong by the pusher chain as above stated. The switch point 44 may be mounted and operated as disclosed in the above identified copending application, or in any suitable manner, and need not be described in greater detail here, it sufficing to state that it may be moved from a feed-in position to a straight-through position and vice versa, as and for the purposes stated.

Referring further to FIGURE 2, two electric limit switches LS-1 and LS-2 are mounted on a bracket frame 45 mounted on and extending across the main line ML a short distance in advance of guide member 38. The switches LS-1 and LS-2 are microswitches of suitable known type, are at opposite sides of and equidistant from the load track LT and are so disposed that their operating arms 46 and 47, respectively, will be actuated by the selector pins 25 and 26 of a load carrier LC approaching the feed-in switch unit G along the load track LT. A third limit switch LS-3, which may be any suitable type of micro-switch is mounted, by a bracket 48 on the load track LT and overlies the curve 41 of the guide member 38. The operating arm of switch LS-3 is disposed above the slot of the guide means and is inclined downward in the direction of travel of a carrier moving therealong to the storage track B. A fourth limit switch LS-4, which also may be any suitable type of micro-switch, is mounted on the entrance end of storage track B. The operating arm of switch LS-3 is disposed to be actuated by the truck of a trolley travelling along the curved portion 41 of guide means 38 and means is also provided for actuating the operating arm of switch LS-4 by a trolley travelling along storage track B.

The transfer means of my invention is operated by a double action pneumatic power unit or cylinder C-2 mounted on load track LT at one side thereof in parallel spaced relation thereto and having an interior reciprocating piston (not shown) as is known. A piston rod 49 is attached to the piston and is slidable through a suitable stuffing box at the inner end of the cylinder C-2.

Admission and exhaust of compressed air to and from the cylinder C-1 and C-2 are controlled by a solenoid operated valve SV of known type, preferably, though not necessarily, a valve known as the "Electroaire" valve. Air under appropriate pressure is supplied, from any suitable source, to a main air supply conduit 52 mounted on frame 36 and connected to the valve SV for supplying operating air thereto. The conduit 52 preferably has interposed therein an air filter F, a pressure regulator P, and a lubricator L, the last for supplying a suitable lubricant to the air, all of known type and operation. A second air conduit 53, mounted on frame 36, is connected at one end to the outer end of cylinder C-1 and is connected at its other end to the outer end of cylinder C-2. The conduit 53 is further appropriately connected to the air control valve SV. A third air conduit 54 is connected at one end to the inner end of cylinder C-1 and is connected at its other end to the inner end of cylinder C-2. Conduit 54 is also appropriately connected to the air control valve SV. As shown, and as will be understood, suitable known fittings are provided for effecting the connections between the air conduits and associated parts.

The air control valve SV is of known type and is solenoid operated, its operation being controlled by the switches LS-1, LS-2, LS-3 and LS-4. The switches LS-1, LS-2 and LS-3 are normally open, the switch LS-4 is normally closed, the piston rod 49 of air cylinder C-2 is normally projected and the piston rod of cylinder C-1 is normally retracted effective for holding the switch point 44 in its straight-through position. The selector pins 25 and 26 of a trolley approaching the feed-in switch unit G and which is to be diverted onto the storage track B close the switches LS-1 and LS-2 thereby energizing a solenoid of the air control valve SV. That admits air to the cylinders C-1 and C-2 thereby projecting the piston rod of cylinder C-1 and retracting the piston rod 49 of cylinder C-2. Cylinder C-1 shifts the switch point 44 from its straight-through position to its trolley diverting or feed-in position effective for diverting the trolley from the load track LT into the guide member 38, and the switches LS-1 and LS-2 then open, due to passage therebeyond of the trolley. In the continued travel of the trolley along guide member 38 its front wheel truck closes switch LS-3 thereby energizing a second solenoid of air control valve SV effective for admitting air to the inner end of cylinder C-1 and the outer end of cylinder C-2 while exhausting air from the other ends thereof, thereby returning switch point 44 to its normal straight-through position and returning piston rod 49 of cylinder C-2 to its normal projected position. It will be understood, from what has been said, that when the control air switch SV admits air to one end of either of the cylinders C-1 and C-2 it also is effective for exhausting air from the other end of such cylinder. The piston rod 49 of cylinder C-2 operates means effective for moving a diverted trolley through the guide member 38 onto the storage track B, as will appear more fully presently. As the trolley travels along guide member 38, its following wheel truck also momentarily closes switch LS-3, but that is not objectionable because the valve SV has been actuated as and for the purpose stated. The trolley passes from the guide member 38 onto the inclined storage track B and its wheel trucks momentarily open the switch LS-4 mounted on that track. Such opening of switch LS-4 does not affect the operation of the transfer means unless the storage track B is filled with trolleys. The switch LS-4 is a sensing switch and corresponds to the sensing device E of the diagram of FIGURE 1. The circuitry of the switches and the control valve SV are disclosed in detail in the above identified copending application of Albert J. Burmeister and Willard D. Brown, Jr., and need not be further described here. It will be understood that, within the broader aspects of my invention, any suitable means may be provided for selectively diverting trolleys from the load track LT for transfer to the storage track B, and such diverting means may be controlled in any suitable manner. The wiring for the electric switches and for the air control valve SV preferably is enclosed by protective conduits as is usual.

Two guide or slider plates 57 and 58 are mounted on frame 36 and guide member 38 in parallel relation with the latter and the adjacent portions of the load track LT and the storage track B, in a suitable manner. As shown, the plates 57 and 58 are supported by appropriately formed angle brackets 59 suitably secured, conveniently by welding, to plates 57 and 58 and to frame 36 and guide member 38 and storage track B. The plates 57 and 58 are disposed in spaced parallel relation defining between them a slot for reception of a pusher chain 60 and piston rod 49 of air cylinder C-2.

Referring to FIGURES 9 and 10, the pusher chain 60 comprises a plurality of inner and outer pairs of links 61 the overlapping ends of which are pivoted together by headed pins 62. One end of chain 60 is pivoted in a shackle 63 by a pin 64 passing through the arms thereof and through the outer ends of the end links of the chain. Pin 64 is provided at one end with a head and receives at its other end a cotter pin effective, in cooperation with the head, for restraining it against lengthwise movement. The shackle 63 is provided with an interiorly threaded hub 65 which is turned onto the threaded outer end of piston rod 49 and locked thereon by a set screw 66. The pusher chain 60 is thus secured to piston rod 49 for movement thereby along the guide plates 57 and 58.

A pair of outer links 67 are pivotally attached to the other end of chain 60 by a pin 68 having a head at one end and receiving through its other end a cotter pin effective, in cooperation with the head, for restraining pin 68 against endwise movement. The outer ends of links 67 are connected by a headed pin 62 passing therethrough and through discs 69 seating on the inner faces of links 67 and corresponding in diameter to the width thereof, the discs 69 being of the same thickness as the inner links of the chain. The links 67 are secured together at their midlength by a flat plate or web member 70 extending between and secured thereto in any suitable manner, conveniently by welding. The thickness of web member 70 is substantially less than the width of links 67, which are of the same width as the other links of the chain 60, the latter being formed of links of uniform length, width and thickness.

The pins 62, 64 and 68 receive sleeve rollers 73, or spacers, of materially less diameter than the width of the chain links. The chain 60 is disposed between the guide plates 57 and 58 with the chain links horizontal and the inner edge portions of plates 57 and 58 extending between the inner pairs of links into close proximity to the rollers 73, as shown in FIGURES 2, 6 and 7. The thickness of the guide plates 57 and 58 preferably is such that they fit snugly, but not tightly, between the inner pairs of links of chain 60 effective for preventing buckling or distortion vertically thereof as well as guiding the chain and, in conjunction with rollers 73, restraining it against lateral or horizontal distortion. The guide plates 57 and 58 are thus effective for taking both vertical and horizontal thrusts to which chain 60 may be subjected in use. As will be understood from what has been said, the chain 60 is moved by piston rod 49 in opposite directions between the guide plates 57 and 58 for picking up a trolley diverted from the load track LT and transferring it to the storage track B.

Referring further to FIGURES 9 and 10, and to FIGURE 5, a slotted block 75 is suitably secured, conveniently by welding, to the under face of the lower link 67 in alignment with the plate or web member 70. A gravity pawl 76 is pivoted at its upper end in block 75 by a pivot pin 77 restrained against endwise movement by C retaining rings 78. The pin 77 is disposed adjacent the upper outer corner of pawl 76 the upper end of which is straight except for the corners which are rounded. Pawl 76 is free for turning movement about pin 77 in counter-clockwise direction as viewed in FIGURE 10—clockwise in FIGURE 5—and is locked against turning movement in the opposite direction beyond its normal position shown. The pawl 76 is provided at its leading edge with two rectangular notches 79 receiving rollers 80 mounted on a pin 81 welded at its lower end to pawl 76. The terminal link element of the chain 60 has been shown, by way of example, as a sub-assembly with the plate or web member 70 and block 75 welded to the links 67 thereof. If desired such sub-assembly may be cast or otherwise formed as a unit with the elements thereof integrally united, as will be obvious.

The piston rod 49 of air cylinders C–2 normally is projected with pusher chain 60 in its projected position. Closing of switches LS–1 and LS–2 causes shifting of the switch point 44 to its feed-in position and retraction of piston rod 49 thereby moving the chain 60 to its position shown in FIGURE 2 and oppositely to the travel of the diverted trolley, which is moved by dog 29a along the guide member 38 and plate 45 as before. In the continued movement of chain 60 in such opposite direction pawl 76 contacts the arm of pusher bar 29 and passes thereover and then drops down to its normal position. Shortly thereafter the switch LS–3 is closed by the trolley causing piston rod 49 of air cylinder C–2 to be projected thereby moving chain 60 along the guide plates 57 and 58 toward the storage track B. The rollers 80 of pawl 76 contact the arm of pusher bar 29 and chain 60 picks up the trolley and sweeps it through the guide means 38 from which the trolley travels onto the inclined storage track B and actuates the switch LS–4, continuing its travel along track B by gravity. That completes the transfer operation and the piston rod 49 of cylinder C–2 then remains projected with chain 60 in its projected position, pending a succeeding transfer operation.

In the modification shown in FIGURE 8, the cylinder C–2 is mounted on the storage track B and the switch point 44 is shown in its straight-through position. The chain 60a is shorter than chain 60 of FIGURE 2 and pawl 76 is reversed relative to FIGURE 10, as shown in FIGURE 11, due to the reversal of the end link unit comprising the links 67 and associated elements. The piston rod 49 of air cylinder C–2 is normally retracted. Closing of the switches LS–1 and LS–2 causes piston rod 49 to be projected and in the outward movement of chain 60a pawl 76 passes over and drops down in back of the arm of pusher bar 29 of a trolley approaching switch LS–3. Shortly thereafter switch LS–3 is closed by the trolley thereby causing retraction of the piston rod 49 so that the chain 60a picks up the trolley and sweeps it around the guide means 38 onto the storage track B, terminating the transfer operation. The operation is the same as in FIGURE 2 with the exception that the air control valve SV is properly adjusted to cause piston rod 49 of air cylinder C–2 to be projected responsive to closing of the switches LS–1 and LS–2 and retracted responsive above noted, the air control valve SV is of known type to closing of switch LS–3, as will be understood. As and may readily be adjusted for either mode of operation.

While I have referred to the chain 60 as a pusher chain, it may be used to either push or pull the trolley through the guide means to the storage track, and the term "pusher chain" is used herein as inclusive of both such uses of that chain. The chain is formed of uniform links and may be readily increased or reduced in length, by adding or subtracting links, to suit the particular installation in which it is to be used. The terminal linkage unit of the chain, comprising the links 67 and associated parts, may be applied to either end of the chain, as may the shackle 63. Accordingly, the chain may be quickly and easily adapted for either pushing or pulling the trolley and may be readily adjusted in length, to suit requirements.

I have disclosed the trolley transfer means of my invention as used in a feed-in switch unit of an automatic dispatch conveyor system, by way of example. It may also be used in the escapement switch of such a system, for transferring trolleys from a storage track to a load track. In the latter case, the transfer means is operated by power means, such as the air cylinder C–2, controlled by appropriately disposed trolley actuated electric switches, as will be understood. In either case, the trolley is diverted or released from one of the tracks and directed onto the trolley guide means along which it is moved, by the transfer means and from which it travels onto the other track, as above described.

As above indicated, changes in detail may be resorted to without departing from the field and scope of my invention, and I intend to include all such variations, as fall within the scope of the appended claims, in this application in which the preferred forms only of my invention are disclosed.

I claim:

1. In means for transferring a trolley from a track of a conveyor system comprising a load track and a storage track with trolleys traveling along said load track and means for selectively releasing trolleys from one of said tracks, trolley guide means for directing a released trolley onto the other of said tracks, transfer member guide means adjacent said trolley guide means, a flexible transfer member operating in said transfer guide means engageable with a released trolley for propelling it along said trolley guide means, said transfer member guide means restraining said transfer member against distortion, and trolley controlled power operating means for said transfer member.

2. In means for transferring a trolley from a track of a conveyor system comprising a load track and a storage track with trolleys traveling along said load track and means for selectively releasing trolleys from one of said tracks, substantially arcuate trolley guide means disposed between said releasing means and the other of said tracks for directing to the latter a released trolley, transfer member guide means adjacent and substantially parallel with said trolley guide means, a flexible transfer member operating in said transfer guide means engageable with a released trolley for propelling it along said trolley guide means, said transfer member guide means restraining said transfer member against distortion, and trolley controlled power operating means for said transfer member.

3. In means for transferring a trolley from a track of a conveyor system comprising a load track and a storage track with trolleys traveling along said load track and means for selectively releasing trolleys from one of said tracks, substantially arcuate trolley guide means disposed between said releasing means and the other of said tracks for directing to the latter a released trolley, transfer member guide means adjacent and substantially parallel with said trolley guide means, said transfer member guide means comprising spaced guide plates defining a guide way between them, a flexible transfer member operating in said guide way engageable with a released trolley for propelling it along said trolley guide means, said transfer member having means cooperating with said plates effective for restraining said transfer member against distortion, and trolley controlled power operating means for said transfer member.

4. In means for transferring a trolley from a track of a conveyor system comprising a load track and a storage track with trolleys traveling along said load track and means for selectively releasing trolleys from one of said tracks, substantially arcuate trolley guide means disposed between said releasing means and the other of said tracks for directing to the latter a released trolley, transfer member guide means adjacent and substantially parallel with said trolley guide means, said transfer member guide means comprising spaced guide plates defining a guide way between them, a flexible transfer member comprising a plurality of inner and outer pairs of links pivoted together at their ends with spacers therebetween, said transfer member being engageable with a released trolley for propelling it along said trolley guide means, said guide plates fitting between the links of said inner pairs and extending into proximity to said spacers effective for restraining said transfer member against distortion, and trolley controlled power operating means for said transfer member.

5. In means for transferring a trolley from a track of a conveyor system comprising a load track and a storage track with trolleys traveling along said load track and means for selectively releasing trolleys from one of said tracks, substantially arcuate trolley guide means disposed between said releasing means and the other of said tracks, for directing to the latter a released trolley, transfer member guide means adjacent and substantially parallel with said trolley guide means, said transfer member guide means comprising spaced guide plates defining a guide way between them, a flexible transfer member comprising a plurality of inner and outer pairs of links pivoted together at their ends with spacers therebetween, said transfer member being disposed with said links thereof substantially horizontal, said guide plates fitting between the links of said inner pairs and extending into proximity to said spacers effective for restraining said transfer member against distortion, a depending pawl mounted on one end of said transfer member engageable with a trolley in the travel of said member in one direction and free to pass beyond the trolley in the travel of said transfer member in the opposite direction, and trolley controlled power operating means for said transfer member comprising a reciprocatory member secured to the other end of said transfer member.

6. In means for transferring a trolley from a track of a conveyor system comprising a load track and a storage track with trolleys traveling along said load track and means for selectively releasing trolleys from one of said tracks, substantially arcuate trolley guide means disposed between said releasing means and the other of said tracks for directing to the latter a released trolley, transfer member guide means adjacent and substantially parallel with said trolley guide means, said transfer member guide means comprising spaced guide plates defining a guide way between them, a flexible transfer member comprising a plurality of inner and outer pairs of links pivoted together at their ends with spacers therebetween, said transfer member being disposed with said links thereof substantially horizontal, said guide plates fitting between the links of said inner pairs and extending into proximity to said spacers effective for restraining said transfer member against distortion, a depending pawl mounted on one end of said transfer member engageable with a trolley in the travel of said member in one direction and free to pass beyond the trolley in the travel of said transfer member in the opposite direction, and a trolley controlled power cylinder having a reciprocatory piston rod attached to the other end of said transfer member.

7. In means for transferring trolleys from a track of a conveyor system comprising a power track, a load track, trolleys traveling along said load track with laterally projecting pusher arms, means on said power track engaging said arms for propelling the trolleys along said load track, a storage track substantially perpendicular to said load track, and means for selectively releasing the trolleys from one of said load and storage tracks for delivery to the other thereof; said transfer means comprising means for guiding a released trolley to said other track, transfer member guide plates spaced apart and substantially parallel with said trolley guiding means, a transfer member comprising a plurality of inner and outer pairs of links pivoted together at their ends with spacers therebetween, said transfer member being disposed with said links thereof substantially horizontal, said guide plates fitting between the links of said inner pairs and extending into proximity to said spacers effective for restraining said transfer member against distortion, a depending pawl mounted on one end of said transfer member engageable with the pusher arm of a trolley in the travel of said member toward said one track and free to pass over the pusher arm in the travel of said member in the opposite direction, and a power cylinder substantially parallel with one of said tracks having a reciprocatory piston rod attached to the other end of said transfer member.

8. In means for transferring trolleys from one track to another track of a conveyor system, two spaced guide plates defining between them a guide way, a transfer member operating in said guide way comprising a plurality of inner and outer pairs of links pivoted together at their ends and spaced apart, said plates fitting between the links of said inner pairs, a depending pawl mounted on one end of said transfer member engageable with a trolley in the travel of said member in one direction and free to pass beyond the trolley in the travel of said transfer member in the opposite direction, and trolley controlled power operating means for said transfer member comprising a reciprocatory member secured to the other end of said transfer member.

9. In means for transferring trolleys from one track to another track of a conveyor system, two spaced guide plates defining between them a guide way, a transfer member operating in said guide way comprising a plurality of inner and outer pairs of links pivoted together at their ends and spaced apart by spacers therebetween, said plates fitting between the links of said inner pairs and extending into proximity to said spacers, a depending pawl mounted on one end of said transfer member engageable with a trolley in the travel of said member in one direction and free to pass beyond the trolley in the travel of said transfer member in the opposite direction, and trolley controlled power operating means for said transfer member comprising a reciprocatory member secured to the other end of said transfer member.

10. In a transfer member for transferring trolleys from one track to another track of a conveyor system, a plurality of inner and outer pairs of flat and substantially uniform links pivoted together at their ends and spaced apart by spacers of materially less width than said links, a depending pawl pivoted on one terminal link of said member for free turning movement in one direction and restrained against turning movement in the opposite direction, and means for attaching the other terminal link of said member to a reciprocatory power operating member.

11. In a transfer member for transferring trolleys from one track to another track of a conveyor system, a plurality of inner and outer pairs of substantially uniform links having flat inner faces and pivoted together at their ends with spacers therebetween of materially less width than said links, a pawl mounted on one terminal link of said member for displacement in one direction and restrained against displacement in the opposite direction, and means for attaching the other terminal link of said member to a reciprocatory power operating member.

12. In a transfer member for transferring trolleys from one track to another track of a conveyor system, a plurality of inner and outer pairs of substantially uniform links having flat inner faces and disposed with their ends in overlapping relation, pivot pins passing through the overlapping ends of said links, cylindrical spacing sleeves of materially less diameter than the width of said links rotatably mounted on said pins spacing the links of said pairs apart, a depending pawl pivoted on one terminal link of said member for free turning movement in one direction and restrained against turning movement in the opposite direction, and means for attaching the other terminal link of said member to a reciprocatory power operating member.

References Cited in the file of this patent

UNITED STATES PATENTS

| | | |
|---|---|---|
| 706,139 | Werner | Aug. 5, 1902 |
| 1,350,986 | Caudron | Aug. 24, 1920 |
| 2,938,404 | Tatum et al. | May 31, 1960 |
| 2,948,235 | Stamler | Aug. 9, 1960 |